US012796686B2

(12) United States Patent
Wailes et al.

(10) Patent No.: US 12,796,686 B2

(45) Date of Patent: Nov. 17, 2026

(54) MIXTURES OF PYRIMIDINES AS HERBICIDAL COMPOSITIONS

(71) Applicant: SYNGENTA CROP PROTECTION AG, Basel (CH)

(72) Inventors: Jeffrey Steven Wailes, Bracknell (GB); Thomas Edward Holloway, Bracknell (GB); Melanie Jayne Watkins, Bracknell (GB)

(73) Assignee: SYNGENTA CROP PROTECTION AG, Basel (CH)

(*) Notice: Subject to any disclaimer, the term of this patent is extended or adjusted under 35 U.S.C. 154(b) by 422 days.

(21) Appl. No.: 18/249,416

(22) PCT Filed: Oct. 19, 2021

(86) PCT No.: PCT/EP2021/078985

§ 371 (c)(1),
(2) Date: Apr. 18, 2023

(87) PCT Pub. No.: WO2022/084334

PCT Pub. Date: Apr. 28, 2022

(65) Prior Publication Data

US 2023/0389548 A1 Dec. 7, 2023

(30) Foreign Application Priority Data

Oct. 19, 2020 (GB) ..................................... 2016569

(51) Int. Cl.
*A01N 43/54* (2006.01)
*A01N 43/28* (2006.01)
(Continued)

(52) U.S. Cl.
CPC ............. *A01N 43/54* (2013.01); *A01N 43/28* (2013.01); *A01N 43/38* (2013.01); *A01N 43/40* (2013.01); *A01N 43/44* (2013.01); *A01P 13/00* (2021.08)

(58) Field of Classification Search
CPC combination set(s) only.
See application file for complete search history.

(56) References Cited

U.S. PATENT DOCUMENTS

| | | | | |
|---|---|---|---|---|
| 6,537,948 | B1 | 3/2003 | Tohyama | |
| 9,278,985 | B2 | 3/2016 | Eckelbarger | |
| 2014/0274695 | A1* | 9/2014 | Eckelbarger ......... | C07D 405/04 546/281.1 |

FOREIGN PATENT DOCUMENTS

| | | | |
|---|---|---|---|
| CA | 3 188 623 | A1 | 2/2022 |
| CN | 110876385 | A | 3/2020 |

(Continued)

OTHER PUBLICATIONS

Chemical Book (https://www.chemicalbook.com/ProductChemicalPropertiesCB95487335_EN.htm), no pagination, no date.*

(Continued)

*Primary Examiner* — Erin E Hirt
(74) *Attorney, Agent, or Firm* — BakerHostetler; Toni-Junell Herbert

(57) ABSTRACT

The present invention relates to compositions comprising as component (A) at least one compound of formula (I), or an agrochemically acceptable salt thereof wherein $R_1$ is (II) or (III) and, as component (B), at least one compound, or agrochemically acceptable salt thereof, selected from the group consisting of B-I, B-II, B-III, B-IV, B-V, B-VI, B-VII, B-VIII, B-IX and to their use in controlling plants or inhibiting plant growth.

(I)

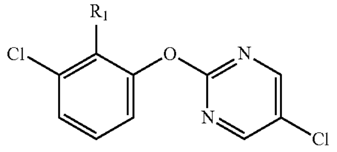

(II)

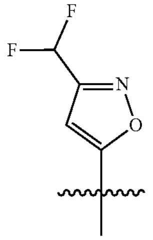

or (III)

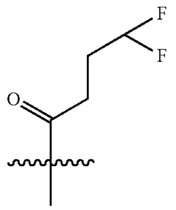

B-I

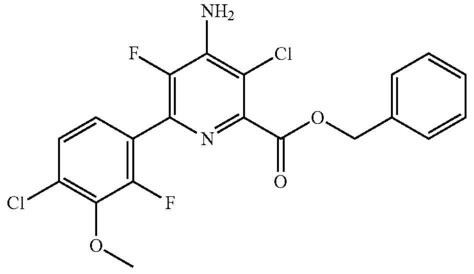

(Continued)

-continued

B-II

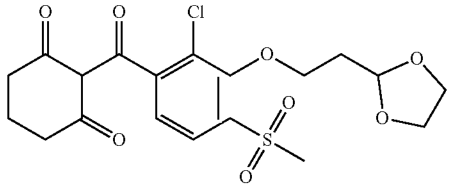

B-III

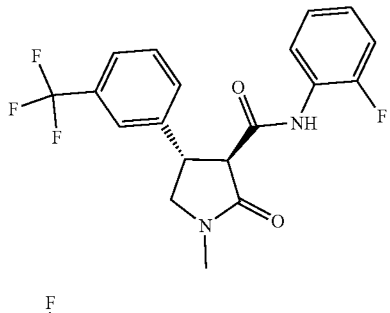

B-IV

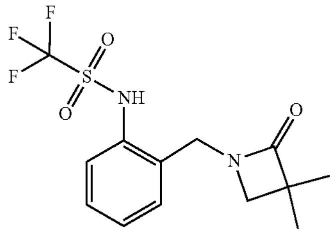

B-V

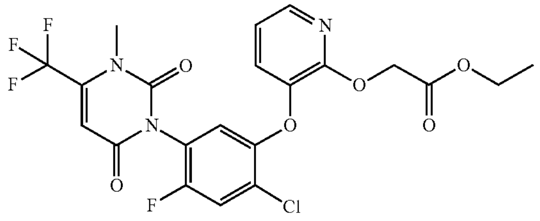

B-VI

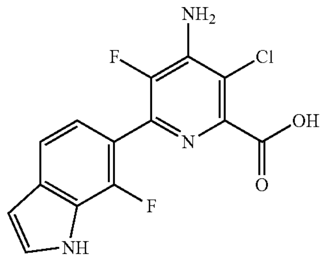

B-VII

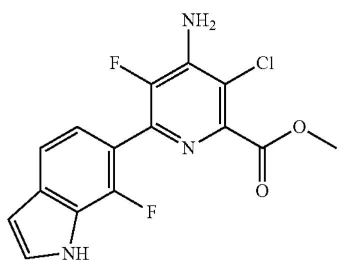

-continued

B-VIII

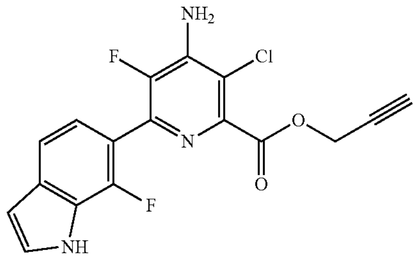

B-IX

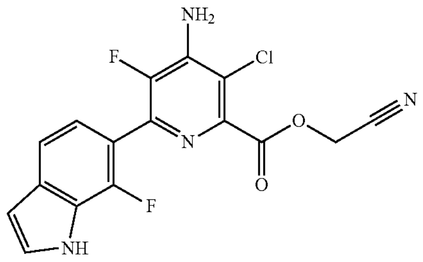

19 Claims, No Drawings

(51) Int. Cl.

| | |
|---|---|
| ***A01N 43/38*** | (2006.01) |
| ***A01N 43/40*** | (2006.01) |
| ***A01N 43/44*** | (2006.01) |
| ***A01P 13/00*** | (2006.01) |

(56) References Cited

FOREIGN PATENT DOCUMENTS

| | | | | | |
|---|---|---|---|---|---|
| EP | 1122244 | B1 * | 8/2001 | ........... C07D 239/54 |
| JP | 2020023443 | A * | 2/2020 | |
| WO | 2005118530 | A1 | 12/2005 | |
| WO | 2010026989 | A1 | 3/2010 | |
| WO | 2014018392 | A2 | 1/2014 | |
| WO | 2014018397 | A1 | 1/2014 | |
| WO | 2014018409 | A1 | 1/2014 | |
| WO | 2015108779 | A1 | 7/2015 | |
| WO | 2016196606 | A1 | 12/2016 | |
| WO | WO-2016196593 | A1 * | 12/2016 | ........... C07D 471/04 |
| WO | 2017075559 | A1 | 5/2017 | |
| WO | 2018208582 | A1 | 11/2018 | |
| WO | 2021127126 | A1 | 6/2021 | |

OTHER PUBLICATIONS

Colby SR; "Calculating Synergistic and Antagonistic Responses of Herbicide Combinations", Weeds, Weed Society of America, Urbana, IL, US, vol. 15, Jan. 1, 1967, pp. 20-22, XP001112961, ISSN: 0096-719X.

Schwartz-Lazaro, Lauren M. et al; "Comparison of Simulated Drift Rates of Common ALS-Inhibiting Rice Herbicides to Florpyrauxifen-Benzyl on Soybean", International Journal of Agronomy, vol. 2017, Jan. 1, 2017, pp. 1-5, XP055873520, ISSN: 1687-8159, DOI: 10.1155/2017/9583678.

(56) References Cited

OTHER PUBLICATIONS

WIPO; App. No. PCT/EP2021/078985; International Search Report and Written Opinion mailed Jan. 4, 2022; pp. 1-15.
Great Britain Search Report issued in GB2016569.2, dated Mar. 30, 2021.
Canadian Office Action issued in Canadian Patent Application No. 3,195,135 dated Sep. 11, 2026; 5 pages.

* cited by examiner

MIXTURES OF PYRIMIDINES AS HERBICIDAL COMPOSITIONS

CROSS-REFERENCE TO RELATED APPLICATIONS

This application is a U.S. National Stage Application, filed under 35 U.S.C. § 371, of International Application No. PCT/EP2021/078985, filed Oct. 19, 2021, which claims priority to GB 2016569.2, filed Oct. 19, 2020, the entire contents of which are incorporated by reference herein.

The present invention relates to novel herbicidal combinations and their use in controlling plants or inhibiting plant growth.

In a first aspect of the invention, there is provided a composition comprising, as component (A), at least one compound of formula (I), or an agrochemically acceptable salt thereof:

(I)

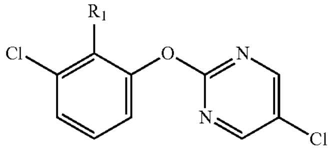

wherein $R_1$ is:

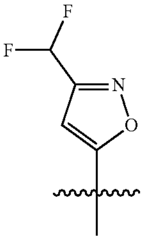

or

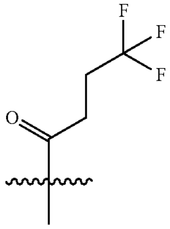

and, as component (B), at least one compound, or agrochemically acceptable salt thereof, selected from the group consisting of:

B-I

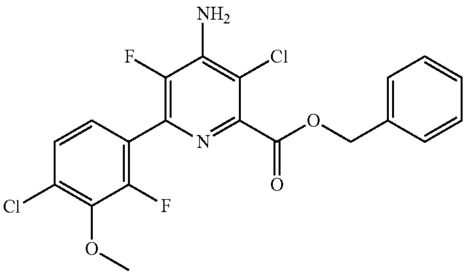

B-II

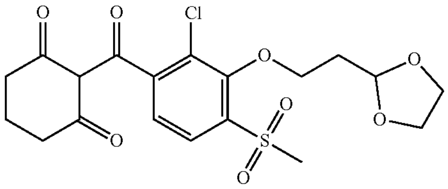

-continued

B-III

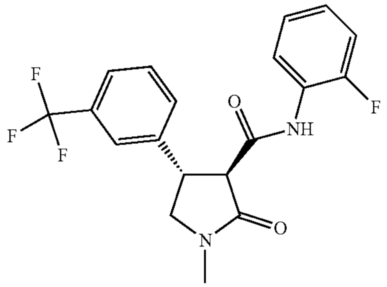

B-IV

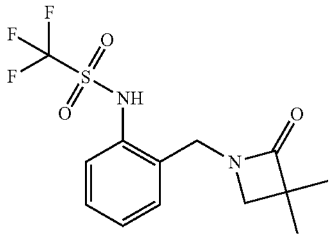

B-V

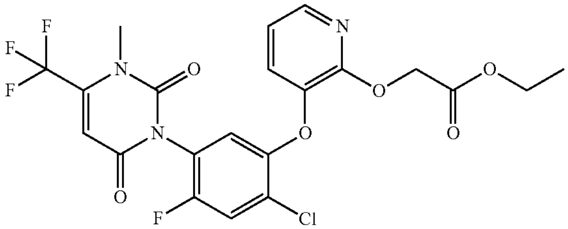

B-VI

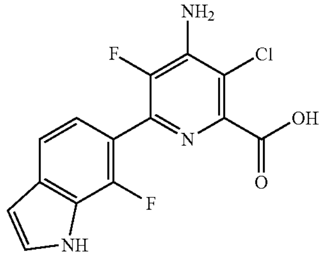

B-VII

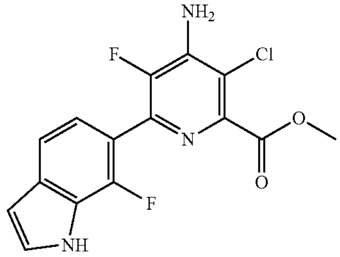

B-VIII

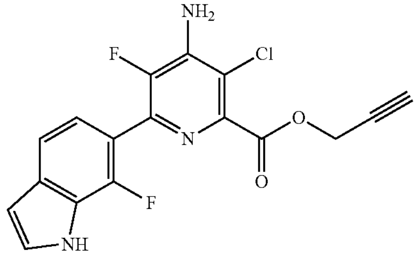

-continued

B-IX

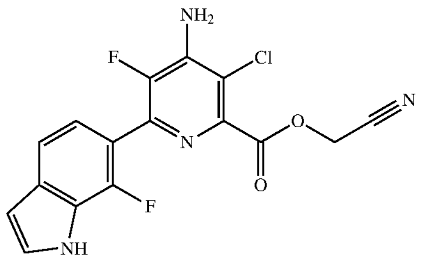

In a second aspect, the invention provides the use of a composition of the invention as a herbicide.

In a third aspect, the invention provides methods of (i) inhibiting plant growth, and (ii) controlling plants, said methods comprising applying to the plants, parts thereof or to the locus thereof, a herbicidally effective amount of a composition of the invention.

In a fourth aspect, the invention provides a method of selectively controlling grasses and/or weeds in crops of useful plants which comprises applying to the useful plants, parts thereof or the locus thereof or to the area of cultivation a herbicidally effective amount of a composition of the invention.

In a fifth aspect, the invention provides a formulation comprising a composition of the invention, comprising from 0.01 to 90% by weight of active agents, from 0 to 25% of agriculturally acceptable surfactant and from 10 to 99.9% solid or liquid formulation inerts and adjuvant(s).

In a sixth aspect, the invention provides a concentrated composition for dilution by a user, comprising a composition of the invention, comprising of from 2 to 80%, preferably between about 5 and 70%, by weight of active agents.

When active ingredients are combined, the activity to be expected (E) for any given active ingredient combination obeys the so-called Colby Formula and can be calculated as follows (Colby, S. R., Calculating synergistic and antagonistic responses of herbicide combination, Weeds, Vol. 15, pages 20-22; 1967):

ppm=milligrams of active ingredient (a.i.) per litre

X=% action by first active ingredient using p ppm of the active ingredient

Y=% action by second active ingredient using q ppm of the active ingredient.

According to Colby, the expected action of active ingredients A+B using p+q ppm of active ingredient is represented by the following formula:

$$E = X + Y - \frac{X \cdot Y}{100}$$

If the action actually observed (O) is greater than the expected action (E) then the action of the combination is super-additive, i.e. there is a synergistic effect. In mathematical terms, synergism corresponds to a positive value for the difference of (O-E). In the case of purely complementary addition of activities (expected activity), said difference (O-E) is zero. A negative value of said difference (O-E) signals a loss of activity compared to the expected activity.

Compounds of formula (I) have the structure A-I or A-II:

A-I

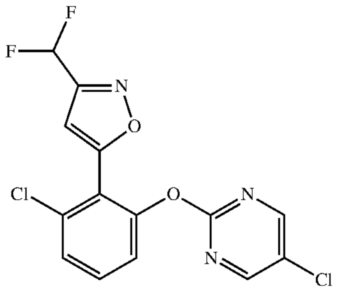

A-II

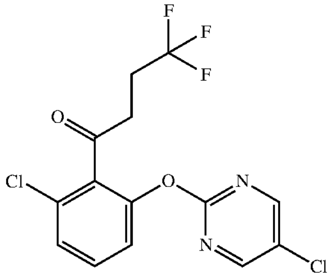

Compounds of formula A-I and A-II; and of formula B-I to B-IX are all effective herbicidal compounds.

The compound of formula A-I is described in WO 2015/108779. The compound of formula A-II is described in WO 2016/196606.

Compound B-I is described in US 2012/019055. Compound B-II is described in WO 2013/176282.

Compound B-III is described in WO 2016/196593. Compound B-IV is described in WO 2010/126989.

Compound B-V is described in EP 1 122 244. Compounds B-VI and B-VII are described in US 2014/274695.

Compounds B-VIII and B-IX are described in WO 2018/208582.

Accordingly, the combination of the present invention takes advantage of any additive herbicidal activity, and certain embodiments may even exhibit a synergistic effect. This occurs whenever the action of an active ingredient combination is greater than the sum of the actions of the individual components.

Combinations of the invention may also provide for an extended spectrum of activity in comparison to that obtained by each individual component, and/or permit the use of lower rates of the individual components when used in combination to that when used alone, in order to mediate effective herbicidal activity.

In addition, it is also possible that the composition of the invention may show increased crop tolerance, when compared with the effect of the component (A) or component (B) alone. This occurs when the action of an active ingredient combination is less damaging to a useful crop than the action of one of the active ingredients alone.

The presence of one or more possible asymmetric carbon atoms in compounds of components (A) and (B) means that the compounds may occur in chiral isomeric forms, i.e., enantiomeric or diastereomeric forms. Also atropisomers may occur as a result of restricted rotation about a single bond. Formulae (I) and B-I to B-IX are intended to include all those possible isomeric forms and mixtures thereof. The present invention includes all those possible isomeric forms and mixtures thereof. Likewise, the above formulas are intended to include all possible tautomers (including lactam-lactim tautomerism and keto-enol tautomerism) where present. The present invention includes all possible tautomeric forms for the compounds. The present invention includes all these possible isomeric forms and mixtures thereof.

The compounds of the compositions of the present invention will typically be provided in the form of an agronomically acceptable salts, zwitterions or agronomically acceptable salts of zwitterions. This invention covers all such agronomically acceptable salts, zwitterions and mixtures thereof in all proportions.

Suitable agronomically acceptable salts for components (A) and (B) as employed in the present invention, include anions selected from, but not limited to, chloride, bromide, iodide, fluoride, 2-naphthalenesulfonate, acetate, adipate, methoxide, ethoxide, propoxide, butoxide, aspartate, benzenesulfonate, benzoate, bicarbonate, bisulfate, bitartrate, butylsulfate, butylsulfonate, butyrate, camphorate, camsylate, caprate, caproate, caprylate, carbonate, citrate, diphosphate, edetate, edisylate, enanthate, ethanedisulfonate, ethanesulfonate, ethylsulfate, formate, fumarate, gluceptate, gluconate, glucoronate, glutamate, glycerophosphate, heptadecanoate, hexadecanoate, hydrogen sulfate, hydroxide, hydroxynaphthoate, isethionate, lactate, lactobionate, laurate, malate, maleate, mandelate, mesylate, methanedisulfonate, methylsulfate, mucate, myristate, napsylate, nitrate, nonadecanoate, octadecanoate, oxalate, pelargonate, pentadecanoate, pentafluoropropionate, perchlorate, phosphate, propionate, propylsulfate, propylsulfonate, succinate, sulfate, tartrate, tosylate, tridecylate, triflate, trifluoroacetate, undecylinate and valerate; and may be the same for each of components (A) and (B) or may be different.

Suitable cations include, but are not limited to, metals, conjugate acids of amines and organic cations and may be the same for each of components (A) and (B) or may be different. Examples of suitable metals include aluminium, calcium, cesium, copper, lithium, magnesium, manganese, potassium, sodium, iron and zinc. Examples of suitable amines include allylamine, ammonia, amylamine, arginine, benethamine, benzathine, butenyl-2-amine, butylamine, butylethanolamine, cyclohexylamine, decylamine, diamylamine, dibutylamine, diethanolamine, diethylamine, diethylenetriamine, diheptylamine, dihexylamine, diisoamylamine, diisopropylamine, dimethylamine, dioctylamine, dipropanolamine, dipropargylamine, dipropylamine, dodecylamine, ethanolamine, ethylamine, ethylbutylamine, ethylenediamine, ethylheptylamine, ethyloctylamine, ethylpropanolamine, heptadecylamine, heptylamine, hexadecylamine, hexenyl-2-amine, hexylamine, hexylheptylamine, hexyloctylamine, histidine, indoline, isoamylamine, isobutanolamine, isobutylamine, isopropanolamine, isopropylamine, lysine, meglumine, methoxyethylamine, methylamine, methylbutylamine, methylethylamine, methylhexylamine, methylisopropylamine, methylnonylamine, methyloctadecylamine, methylpentadecylamine, morpholine, N,N-diethylethanolamine, N-methylpiperazine, nonylamine, octadecylamine, octylamine, oleylamine, pentadecylamine, pentenyl-2-amine, phenoxyethylamine, picoline, piperazine, piperidine, propanolamine, propylamine, propylenediamine, pyridine, pyrrolidine, sec-butylamine, stearylamine, tallowamine, tetradecylamine, tributylamine, tridecylamine, trimethylamine, triheptylamine, trihexylamine, triisobutylamine, triisodecylamine, triisopropylamine, trimethylamine, tripentylamine, tripropylamine, tris(hydroxymethyl)aminomethane, and undecylamine. Examples of suitable organic cations include benzyltributylammonium, benzyltrimethylammonium, benzyltriphenylphosphonium, choline, tetrabutylammonium, tetrabutylphosphonium, tetraethylammonium, tetraethylphosphonium, tetramethylammonium, tetramethylphosphonium, tetrapropylammonium, tetrapropylphosphonium, tributylsulfonium, tributylsulfoxonium, triethylsulfonium, triethylsulfoxonium, trimethylsulfonium, trimethylsulfoxonium, tripropylsulfonium and tripropylsulfoxonium.

Herbicides of components (A) and (B) are well known in the art and can be obtained commercially or manufactured using methods available in the art. Table 1 describes specific combinations of components (A) and (B) according to the invention.

TABLE 1

Compositions of the invention comprising as component (A) a compound of formula (I) and, as component (B), a herbicide selected from the group consisting of compounds of formula B-I to B-IX.

| Component | Component (A) | |
|---|---|---|
| (B) | Compound of formula A-I | Compound of formula A-II |
| B-I | 1.001 | 1.010 |
| B-II | 1.002 | 1.011 |
| B-III | 1.003 | 1.012 |
| B-IV | 1.004 | 1.013 |
| B-V | 1.005 | 1.014 |
| B-VI | 1.006 | 1.015 |
| B-VII | 1.007 | 1.016 |
| B-VIII | 1.008 | 1.017 |
| B-IX | 1.009 | 1.018 |

Throughout this document the expression "composition" should be interpreted as meaning the various mixtures or combinations of components (A) and (B), for example in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the components (A) and (B) is not essential for working the present invention.

The term "herbicide" as used herein means a compound that controls or modifies the growth of plants. The term "herbicidally effective amount" means the quantity of such a compound or combination of such compounds that is capable of producing a controlling or modifying effect on the growth of plants. Controlling or modifying effects include all deviation from natural development, for example killing, retardation, leaf burn, albinism, dwarfing and the like.

The term "locus" as used herein means fields in or on which plants are growing, or where seeds of cultivated plants are sown, or where seed will be placed into the soil. It includes soil, seeds, and seedlings, as well as established vegetation.

The term "plants" refers to all physical parts of a plant, including seeds, seedlings, saplings, roots, tubers, stems, stalks, foliage, and fruits.

The term "plant propagation material" denotes all generative parts of a plant, for example seeds or vegetative parts of plants such as cuttings and tubers. It includes seeds in the strict sense, as well as roots, fruits, tubers, bulbs, rhizomes, and parts of plants.

The term "safener" as used herein means a chemical that when used in combination with a herbicide reduces the undesirable effects of the herbicide on non-target organisms, for example, a safener protects crops from injury by herbicides but does not prevent the herbicide from killing the weeds.

Crops of useful plants in which the composition according to the invention can be used include perennial and annual crops, such as berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, bluegrass, bentgrass, centipede grass, fescue, ryegrass, St. Augustine grass and Zoysia grass; herbs such as basil, borage, chives, coriander, lavender, lovage, mint, oregano, parsley, rosemary, sage and thyme; legumes for example beans, lentils, peas and soya beans; nuts for example almond, cashew, ground nut, hazelnut, peanut, pecan, pistachio and walnut; palms for example oil palm; ornamentals for example flowers, shrubs and trees; other trees, for example cacao, coconut, olive and rubber; vegetables for example asparagus, aubergine, broccoli, cabbage, carrot, cucumber, garlic, lettuce, marrow, melon, okra, onion, pepper, potato, pumpkin, rhubarb, spinach and tomato; and vines for example grapes.

Crops are to be understood as being those which are naturally occurring, obtained by conventional methods of breeding, or obtained by genetic engineering. They include crops which contain so-called output traits (e.g. improved storage stability, higher nutritional value and improved flavour).

Crops are to be understood as also including those crops which have been rendered tolerant to herbicides or classes of herbicides (e.g. ALS-, GS-, EPSPS-, PPO-, ACCase- and HPPD-inhibitors) by conventional methods of breeding or by genetic engineering. An example of a crop that has been rendered tolerant to imidazolinones, e.g. imazamox, by conventional methods of breeding is Clearfield® summer rape (canola). Examples of crops that have been rendered tolerant to herbicides by genetic engineering methods include e.g. glyphosate- and glufosinate-resistant maize varieties commercially available under the trade names RoundupReady® and LibertyLink®.

Crops are also to be understood as being those which have been rendered resistant to harmful insects by genetic engineering methods, for example Bt maize (resistant to European corn borer), Bt cotton (resistant to cotton boll weevil) and also Bt potatoes (resistant to Colorado beetle). Examples of Bt maize are the Bt 176 maize hybrids of NK® (Syngenta Seeds). The Bt toxin is a protein that is formed naturally by *Bacillus thuringiensis* soil bacteria. Examples of toxins, or transgenic plants able to synthesise such toxins, are described in EP-A-451 878, EP-A-374 753, WO 93/07278, WO 95/34656, WO 03/052073 and EP-A-427 529. Examples of transgenic plants comprising one or more genes that code for an insecticidal resistance and express one or more toxins are KnockOut® (maize), Yield Gard® (maize), NuCOTIN33B® (cotton), Bollgard® (cotton), NewLeaf® (potatoes), NatureGard® and Protexcta®. Plant crops or seed material thereof can be both resistant to herbicides and, at the same time, resistant to insect feeding ("stacked" transgenic events). For example, seed can have the ability to express an insecticidal Cry3 protein while at the same time being tolerant to glyphosate.

Compositions of the invention can typically be used to control a wide variety of monocotyledonous and dicotyledonous weed species. Examples of monocotyledonous species that can typically be controlled include *Alopecurus myosuroides, Avena fatua, Brachiaria plantaginea, Bromus tectorum, Cyperus esculentus, Digitaria sanguinalis, Echinochloa crus-galli, Lolium perenne, Lolium multiflorum, Panicum miliaceum, Poa annua, Setaria viridis, Setaria faberi* and *Sorghum bicolor*. Examples of dicotyledonous species that can be controlled include *Abutilon theophrasti, Amaranthus retroflexus, Bidens pilosa, Chenopodium album, Euphorbia heterophylla, Galium aparine, Ipomoea hederacea, Kochia scoparia, Polygonum convolvulus, Sida spinosa, Sinapis arvensis, Solanum nigrum, Stellaria media, Veronica persica* and *Xanthium strumarium.*

In all aspects of the invention, in any particular embodiment, the weeds, e.g. to be controlled and/or growth-inhibited, may be monocotyledonous or dicotyledonous weeds, which are tolerant or resistant to one or more other herbicides for example, HPPD inhibitor herbicides such as mesotrione, PSII inhibitor herbicides such as atrazine or EPSPS inhibitors such as glyphosate. Such weeds include, but are not limited to resistant *Amaranthus* biotypes.

Compositions of this invention can also be mixed with one or more further pesticides including herbicides different to the herbicides of formula (I) and those of component (B), fungicides, insecticides, nematocides, bactericides, acaricides, growth regulators, chemosterilants, semiochemicals, repellents, attractants, pheromones, feeding stimulants or other biologically active compounds to form a multi-component pesticide giving an even broader spectrum of agricultural protection.

Similarly compositions of the invention (which includes those comprising one or more additional pesticide as described in the preceding paragraph) can further include one or more safeners. In particular, the following safeners are especially preferred: AD 67 (MON 4660), benoxacor, cloquintocet-mexyl, cyometrinil, cyprosulfamide, dichlormid, dicyclonon, dietholate, fenchlorazole-ethyl, fenclorim, flurazole, fluxofenim, furilazole, furilazome, isoxadifen-ethyl, mefenpyr-diethyl, mephenate, oxabetrinil, naphthalic anhydride (CAS RN 81-84-5), TI-35, N-isopropyl-4-(2-methoxy-benzoylsulfamoyl)-benzamide (CAS RN 221668-34-4) and N-(2-methoxybenzoyl)-4-[(methylaminocarbonyl)amino]benzenesulfonamide. Such safeners may also be used in the form of esters or salts, as mentioned e.g. in The Pesticide Manual, 15th Ed. (BCPC), 2009. Thus, the reference to cloquintocet-mexyl also applies to cloquintocet and to a lithium, sodium, potassium, calcium, magnesium, aluminium, iron, ammonium, quaternary ammonium, sulfonium or phosphonium salt thereof as disclosed in WO02/34048 and the reference to fenchlorazole-ethyl also applies to fenchlorazole, etc.

The compositions of the invention can be applied before or after planting of the crops, before weeds emerge (pre-emergence application) or after weeds emerge (post-emergence application). Where a safener is combined with mixtures of the invention, it is preferred that the mixing ratio of compound of formula (I) to safener is from 100:1 to 1:10, especially from 20:1 to 1:1.

It is possible that the safener and the compositions of the invention are applied simultaneously. For example, the safener and the composition of the invention might be applied to the locus pre-emergence or might be applied to the crop post-emergence. It is also possible that the safener and the composition of the invention are applied sequentially. For example, the safener might be applied before sowing the seeds as a seed treatment and the composition of the invention might be applied to the locus pre-emergence or might be applied to the crop post-emergence.

However, the skilled man will appreciate that compositions of the invention are particularly useful in non-selective burn-down applications, and as such may also be used to control volunteer or escape crop plants. In such situations, it is clearly not necessary to include a safener in a composition of the invention.

In general, the mixing ratio (by weight) of the compound of formula (I) to the compound of component B is from 0.01:1 to 100:1, more preferably from 0.025:1 to 20:1, even more preferably from 1:30 to 20:1. Thus, the preferred ratio ranges for preferred compositions of the invention are given in Table 2 below.

TABLE 2

Exemplar ratio ranges for specific compositions of the invention

| Composition Number | Typical Weight Ratio | Preferred Weight Ratio | More Preferred Weight Ratio |
|---|---|---|---|
| 1.001 | 0.01:1 to 100:1 | 0.025:1 to 20:1 | 1:30 to 16:1 |
| 1.002 | 0.01:1 to 100:1 | 0.025:1 to 20:1 | 1:30 to 16:1 |
| 1.003 | 0.01:1 to 100:1 | 0.025:1 to 20:1 | 1:30 to 16:1 |
| 1.004 | 0.01:1 to 100:1 | 0.025:1 to 20:1 | 1:30 to 16:1 |
| 1.005 | 0.01:1 to 100:1 | 0.025:1 to 20:1 | 1:30 to 16:1 |
| 1.006 | 0.01:1 to 100:1 | 0.025:1 to 20:1 | 1:30 to 16:1 |
| 1.007 | 0.01:1 to 100:1 | 0.025:1 to 20:1 | 1:30 to 16:1 |
| 1.008 | 0.01:1 to 100:1 | 0.025:1 to 20:1 | 1:30 to 16:1 |
| 1.009 | 0.01:1 to 100:1 | 0.025:1 to 20:1 | 1:30 to 16:1 |
| 1.010 | 0.01:1 to 100:1 | 0.025:1 to 20:1 | 1:30 to 16:1 |
| 1.011 | 0.01:1 to 100:1 | 0.025:1 to 20:1 | 1:30 to 16:1 |
| 1.012 | 0.01:1 to 100:1 | 0.025:1 to 20:1 | 1:30 to 16:1 |
| 1.013 | 0.01:1 to 100:1 | 0.025:1 to 20:1 | 1:30 to 16:1 |
| 1.014 | 0.01:1 to 100:1 | 0.025:1 to 20:1 | 1:30 to 16:1 |
| 1.015 | 0.01:1 to 100:1 | 0.025:1 to 20:1 | 1:30 to 16:1 |
| 1.016 | 0.01:1 to 100:1 | 0.025:1 to 20:1 | 1:30 to 16:1 |
| 1.017 | 0.01:1 to 100:1 | 0.025:1 to 20:1 | 1:30 to 16:1 |
| 1.018 | 0.01:1 to 100:1 | 0.025:1 to 20:1 | 1:30 to 16:1 |

The skilled person will appreciate that the most preferred ratio range of A:B for any one of composition numbers 1.001 to 1.018 described in Table 2 above is from 1:30 to 20:1, and that each one of composition numbers 1.001 to 1.018 described in Table 2 may be used at any one of the following individualised ratios: 1:30, 1:15, 2:15, 3:20, 1:6, 1:5, 1:4, 4:15, 3:10, 1:3, 5:14, 3:8, 2:5, 8:15, 3:5, 5:7, 3:4, 4:5, 1:2, 1:1, 16:15, 6:5, 4:3, 10:7, 3:2, 8:5, 5:3, 2:1, 12:5, 8:3, 20:7, 16:5, 10:3, 4:1, 8:1, 12:1, and 16:1.

When applied in a composition of the invention component (A) is typically applied at a rate of 50 to 2000 g/ha, more particularly 50, 75, 100, 125, 150, 200, 250, 300, 400, 500, 750, 800, 1000, 1250, 1500, 1800, or 2000 g/ha. Such rates of component (A) are applied typically in association with 5 to 2000 g/ha of component B, and more specifically in association with 5, 10, 15, 20, 25, 50, 75, 100, 125, 140, 150, 200, 250, 300, 400, 500, 750, 1000, 1250, 1500, 1800, or 2000 g/ha of component (B). The Examples described herein illustrate but do not limit the range of rates of components (A) and (B) that may be employed in the invention.

The amount of a composition according to the invention to be applied, will depend on various factors, such as the compounds employed; the subject of the treatment, such as, for example plants, soil or seeds; the type of treatment, such as, for example spraying, dusting or seed dressing; or the application time. In agricultural practice the application rates of the composition according to the invention depend on the type of effect desired, and typically range from 55 to 4000 g of total composition per hectare, and more commonly between 55 and 2000 g/ha. The application is generally made by spraying the composition, typically by tractor mounted sprayer for large areas, but other methods such as dusting (for powders), drip or drench can also be used.

The compositions of the invention can advantageously be used in the below-mentioned formulations (in which case "active ingredient" relates to the respective mixture of compound of formula (I) with a compound of component B or, when a safener is also used, the respective mixture of the compound of formula (I) with the compound of component B and the safener).

The individual components of the composition of the invention may be utilised as the technical active ingredient as produced. More typically however, the compositions according to the invention may be formulated in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, microemulsifiable concentrates, oil-in-water emulsions, oil-flowables, aqueous dispersions, oily dispersions, suspo-emulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono and di-alkylphosphate esters; and also further substances described e.g. in McCutcheon's Detergents and Emulsifiers Annual, MC Publishing Corp., Ridgewood New Jersey (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The formulations according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, $10^{th}$ Edition, Southern Illinois University, 2010.

The formulations generally comprise from 0.1 to 99% by weight, especially from 0.1 to 95% by weight, of compounds (A) and (B) and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 10 to 1000 l/ha.

Preferred formulations can have the following compositions (weight %), wherein the term "active ingredient" refers to the total weight % of the combination of all active ingredients in the composition:

Emulsifiable Concentrates:
active ingredient: 1 to 95%, preferably 60 to 90%
surface-active agent: 1 to 30%, preferably 5 to 20%
liquid carrier: 1 to 80%, preferably 1 to 35%

Dusts:
active ingredient: 0.1 to 10%, preferably 0.1 to 5%
solid carrier: 99.9 to 90%, preferably 99.9 to 99%

Suspension Concentrates:
active ingredient: 5 to 75%, preferably 10 to 50%
water: 94 to 24%, preferably 88 to 30%
surface-active agent: 1 to 40%, preferably 2 to 30%

Wettable Powders:
active ingredient: 0.5 to 90%, preferably 1 to 80%
surface-active agent: 0.5 to 20%, preferably 1 to 15%
solid carrier: 5 to 95%, preferably 15 to 90%

Granules:
active ingredient: 0.1 to 30%, preferably 0.1 to 15%
solid carrier: 99.5 to 70%, preferably 97 to 85%

Various aspects and embodiments of the present invention will now be illustrated in more detail by way of example. It will be appreciated that modification of detail may be made without departing from the scope of the invention.

EXAMPLES

Formulation Examples

| Wettable powders | a) | b) | c) |
|---|---|---|---|
| active ingredients | 25% | 50% | 75% |
| sodium lignosulfonate | 5% | 5% | — |
| sodium lauryl sulphate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

The combination is thoroughly mixed with the adjuvants and the mixture is thoroughly ground in a suitable mill, affording wettable powders that can be diluted with water to give suspensions of the desired concentration.

| Powders for dry seed treatment | a) | b) | c) |
|---|---|---|---|
| active ingredients | 25% | 50% | 75% |
| light mineral oil | 5% | 5% | 5% |
| highly dispersed silicic acid | 5% | 5% | — |
| Kaolin | 65% | 40% | — |
| Talcum | — | | 20 |

The combination is thoroughly mixed with the adjuvants and the mixture is thoroughly ground in a suitable mill, affording powders that can be used directly for seed treatment.

| Emulsifiable concentrate | |
|---|---|
| active ingredients | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

Emulsions of any required dilution, which can be used in plant protection, can be obtained from this concentrate by dilution with water.

| Dusts | a) | b) | c) |
|---|---|---|---|
| Active ingredients | 5% | 6% | 4% |
| Talcum | 95% | — | — |
| Kaolin | — | 94% | — |
| mineral filler | — | — | 96% |

Ready-for-use dusts are obtained by mixing the combination with the carrier and grinding the mixture in a suitable mill. Such powders can also be used for dry dressings for seed.

| Extruded granules | |
|---|---|
| Active ingredients | 15% |
| sodium lignosulfonate | 2% |
| Carboxymethylcellulose | 1% |
| Kaolin | 82% |

The combination is mixed and ground with the adjuvants, and the mixture is moistened with water. The mixture is extruded and then dried in a stream of air.

| Coated granules | |
|---|---|
| Active ingredients | 8% |
| polyethylene glycol (mol. wt. 200) | 3% |
| Kaolin | 89% |

The finely ground combination is uniformly applied, in a mixer, to the kaolin moistened with polyethylene glycol. Non-dusty coated granules are obtained in this manner.

| Suspension concentrate | |
|---|---|
| active ingredients | 40% |
| propylene glycol | 10% |
| nonylphenol polyethylene glycol ether (15 mol of ethylene oxide) | 6% |
| Sodium lignosulfonate | 10% |
| Carboxymethylcellulose | 1% |
| silicone oil (in the form of a 75% emulsion in water) | 1% |
| Water | 32% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

| Flowable concentrate for seed treatment | |
|---|---|
| active ingredients | 40% |
| propylene glycol | 5% |
| copolymer butanol PO/EO | 2% |
| Tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension

28 Parts of the combination are mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredients. The medium capsule diameter is 8-15 microns. The resulting formulation is applied to seeds as an aqueous suspension in an apparatus suitable for that purpose.

BIOLOGICAL EXAMPLES

Seeds of *Setaria faberi* (SETFA), *Echinochloa crus-galli* (ECHCG), *Digitaria sanguinalis* (DIGSA), *Lolium perenne* (LOLPE), *Alopecurus myosuroides* (ALOMY), *Chenopodium album* (CHEAL), *Ipomoea hederacea* (IPOHE), *Stellaria media* (STEME), *Abutilon threophrasti* (ABUTH), *Amaranthus retroflexus* (AMARE) were sown in standard sterilised soil in pots. After cultivation for 8 days under controlled conditions in a glasshouse (at 24/19° C., day/night; 16 hours light; no humidity control), the plants were sprayed at 500 l/Ha with an aqueous spray solution derived from the formulation of the technical active ingredients in a small amount of acetone and a solvent and emulsifier mixture referred to as IF50 (11.12% Emulsogen EL360™+44.44% N-methylpyrrolidone+44.44% Dowanol DPM glycol ether), to create a 50 g/l solution which was then diluted using 0.2% Genapol XO80 (CAS Number: 9043-30-5) as diluent to give the desired final dose of test compound.

Where active ingredients were applied as mixtures, aqueous spray solutions were prepared as above, containing both active ingredients.

The test plants were then grown under controlled conditions in a glasshouse (at 24/18° C., day/night; 15 hours light; 50% humidity) and watered twice daily. After 13 days, the test was evaluated visually for percentage phytotoxicity to the plants (where 100=total damage to plant; 0=no damage to plant; and NC=not captured) when compared to control untreated plants. Two to four replicates were applied for each treatment in a randomised block test design.

The results for the individual active ingredients are shown in Table B1 below and the results for combinations of the present invention are shown in Table B2 below.

TABLE B1

Post-emergence control of weed species of individual compounds

| Compound | Rate (g/ha) | SETFA | ECHCG | DIGSA | LOLPE | ALOMY | IPOHE | ABUTH | CHEAL | AMARE | STEME |
|---|---|---|---|---|---|---|---|---|---|---|---|
| Table B1.1 - Control of weed species by compound A-I | | | | | | | | | | | |
| A-I | 0.625 | 7 | NC | 6 | 4 | 5 | 32 | 15 | 48 | 60 | 44 |
| A-I | 1.25 | 13 | NC | 25 | 5 | 11 | 50 | 41 | 53 | 70 | 60 |
| A-I | 2.5 | 29 | NC | 34 | 8 | 10 | 80 | 49 | 79 | 98 | 88 |
| A-I | 5 | 53 | NC | 63 | 43 | 43 | 79 | 68 | 76 | 98 | 99 |
| A-I | 10 | 65 | NC | 78 | 30 | 41 | 60 | 68 | 78 | 100 | 98 |
| Table B1.2 - Control of weed species by compound B-I | | | | | | | | | | | |
| B-I | 0.625 | 0 | NC | 0 | 0 | 0 | 13 | 75 | 63 | 53 | 50 |
| B-I | 1.25 | 0 | NC | 3 | 0 | 0 | 33 | 83 | 63 | 58 | 58 |
| B-I | 2.5 | 5 | NC | 5 | 0 | 0 | 58 | 80 | 60 | 65 | 75 |
| B-I | 5 | 3 | NC | 0 | 0 | 0 | 55 | 80 | 70 | 58 | 70 |
| B-I | 10 | 20 | NC | 10 | 5 | 3 | 53 | 85 | 75 | 70 | 85 |
| Table B1.3 - Control of weed species by compound B-II | | | | | | | | | | | |
| B-II | 0.625 | 0 | NC | 0 | 0 | 0 | 3 | 3 | 0 | 0 | 0 |
| B-II | 1.25 | 0 | NC | 0 | 0 | 0 | 10 | 38 | 0 | 5 | 13 |
| B-II | 2.5 | 0 | NC | 0 | 0 | 0 | 23 | 50 | 38 | 10 | 45 |
| B-II | 5 | 0 | NC | 0 | 0 | 0 | 38 | 58 | 53 | 28 | 35 |
| B-II | 10 | 3 | NC | 0 | 0 | 0 | 48 | 63 | 65 | 48 | 38 |
| Table B1.4 - Control of weed species by compound B-III | | | | | | | | | | | |
| B-III | 3.125 | 66 | 70 | 72 | 30 | NC | 9 | 10 | 6 | 4 | 13 |
| B-III | 6.25 | 68 | 70 | 74 | 43 | NC | 11 | 4 | 10 | 6 | 21 |
| B-III | 12.5 | 70 | 73 | 78 | 55 | NC | 15 | 3 | 14 | 10 | 14 |
| B-III | 25 | 74 | 73 | 79 | 70 | NC | 24 | 19 | 44 | 21 | 46 |
| B-III | 50 | 73 | 75 | 80 | 75 | NC | 28 | 18 | 56 | 31 | 71 |
| Table B1.5 - Control of weed species by compound B-IV | | | | | | | | | | | |
| B-IV | 31.25 | 2 | 1 | 0 | 0 | 4 | 55 | 80 | 0 | 0 | 85 |
| B-IV | 62.5 | 0 | 13 | 3 | 0 | 2 | 80 | 80 | 8 | 15 | 85 |
| B-IV | 125 | 10 | 38 | 8 | 0 | 1 | 75 | 90 | 15 | 43 | 91 |
| B-IV | 250 | 8 | 60 | 10 | 8 | 3 | 83 | 98 | 40 | 43 | 93 |
| B-IV | 500 | 33 | 78 | 15 | 38 | 8 | 83 | 85 | 25 | 75 | 90 |
| B-IV | 1000 | 63 | 90 | 55 | 65 | 8 | 94 | 85 | 75 | 85 | 93 |

TABLE B1-continued

| Compound | Rate (g/ha) | SETFA | ECHCG | DIGSA | LOLPE | ALOMY | IPOHE | ABUTH | CHEAL | AMARE | STEME |
|---|---|---|---|---|---|---|---|---|---|---|---|
| Post-emergence control of weed species of individual compounds | | | | | | | | | | | |
| Table B1.6 - Control of weed species by compound B-V | | | | | | | | | | | |
| B-V | 0.31 | 30 | 5 | 13 | 2 | 2 | 58 | 97 | 85 | 98 | 25 |
| B-V | 0.625 | 38 | 3 | 43 | 0 | 2 | 70 | 98 | 96 | 98 | 83 |
| B-V | 1.25 | 85 | 9 | 88 | 8 | 10 | 100 | 100 | 93 | 100 | 83 |
| B-V | 2.5 | 99 | 23 | 99 | 15 | 20 | 100 | 100 | 100 | 100 | 100 |
| B-V | 5 | 100 | 65 | 100 | 25 | 28 | 100 | 100 | 100 | 100 | 100 |
| Table B1.7 - Control of weed species by compound B-VI | | | | | | | | | | | |
| B-VI | 0.625 | 0 | NC | 0 | 0 | 0 | 13 | 38 | 58 | 58 | 78 |
| B-VI | 1.25 | 0 | NC | 0 | 0 | 0 | 35 | 55 | 73 | 65 | 50 |
| B-VI | 2.5 | 0 | NC | 0 | 0 | 0 | 38 | 73 | 75 | 73 | 65 |
| B-VI | 5 | 48 | NC | 8 | 8 | 33 | 48 | 78 | 94 | 95 | 98 |
| B-VI | 10 | 70 | NC | 43 | 8 | 30 | 50 | 78 | 84 | 90 | 90 |

To determine if mixtures of active ingredients had a synergistic effect on percentage phytotoxicity of the test plants, Colby's formula was applied: S. R. Colby (1967) "Calculating synergistic and antagonistic responses of herbicide combinations", Weeds 15, p. 22., $E=X+Y-(X*Y/100)$, where X=average percent phytotoxicity of herbicide A when applied at a certain rate Y=average percent phytotoxicity using herbicide B when applied at a certain rate E=the expected effect of the mixture of herbicides A and B as calculated from the Colby formula.

TABLE B2

Post-emergence herbicidal activity of compounds of the present invention comprising mixtures of components (A) and (B) compared with activity of the individual components.

| Compound | Rate (g/ha) | Observed | Expected | Difference |
|---|---|---|---|---|
| Table B2.1 - Herbicidal activity of composition 1.003 of Table 1 | | | | |
| B2.1.1 - LOLPE | | | | |
| A-I | 0.625 | 0 | — | — |
| A-I | 1.25 | 0 | — | — |
| B-III | 6.25 | 43 | — | — |
| B-III | 12.5 | 55 | — | — |
| A-I + B-III | 1.25 + 6.25 | 68 | 43 | 25 |
| A-I + B-III | 0.625 + 6.25 | 73 | 43 | 30 |
| A-I + B-III | 1.25 + 12.5 | 70 | 55 | 15 |
| A-I + B-III | 0.625 + 12.5 | 68 | 55 | 13 |
| B2.1.2 - ECHCG | | | | |
| A-I | 5 | 20 | — | — |
| A-I | 0.625 | 8 | — | — |
| B-III | 50 | 75 | — | — |
| B-III | 12.5 | 73 | — | — |
| A-I + B-III | 5 + 50 | 91 | 80 | 11 |
| A-I + B-III | 0.625 + 12.5 | 88 | 75 | 13 |
| B2.1.3 - SETFA | | | | |
| A-I | 5 | 40 | — | — |
| B-III | 25 | 74 | — | — |
| A-I + B-III | 5 + 25 | 95 | 84 | 11 |
| B2.1.4 - STEME | | | | |
| A-I | 1.25 | 40 | — | — |
| B-III | 6.25 | 21 | — | — |
| B-III | 12.5 | 14 | — | — |

TABLE B2-continued

Post-emergence herbicidal activity of compounds of the present invention comprising mixtures of components (A) and (B) compared with activity of the individual components.

| Compound | Rate (g/ha) | Observed | Expected | Difference |
|---|---|---|---|---|
| A-I + B-III | 1.25 + 6.25 | 75 | 53 | 22 |
| A-I + B-III | 1.25 + 12.5 | 80 | 48 | 32 |
| B2.1.5 - AMARE | | | | |
| A-I | 1.25 | 55 | — | — |
| B-III | 6.25 | 6 | — | — |
| A-I + B-III | 1.25 + 6.25 | 70 | 58 | 12 |
| B2.1.6 - CHEAL | | | | |
| A-I | 1.25 | 45 | — | — |
| B-III | 6.25 | 10 | — | — |
| B-III | 12.5 | 14 | — | — |
| A-I + B-III | 1.25 + 6.25 | 70 | 51 | 19 |
| A-I + B-III | 1.25 + 12.5 | 73 | 53 | 20 |
| B2.1.7 - ABUTH | | | | |
| A-I | 1.25 | 8 | — | — |
| A-I | 2.5 | 25 | — | — |
| B-III | 6.25 | 4 | — | — |
| B-III | 12.5 | 3 | — | — |
| B-III | 25 | 19 | — | — |
| B-III | 50 | 18 | — | — |
| A-I + B-III | 1.25 + 6.25 | 40 | 11 | 29 |
| A-I + B-III | 2.5 + 12.5 | 40 | 27 | 13 |
| A-I + B-III | 1.25 + 12.5 | 40 | 10 | 30 |
| A-I + B-III | 2.5 + 25 | 60 | 39 | 21 |
| A-I + B-III | 2.5 + 50 | 55 | 38 | 17 |
| Table B2.2 - Herbicidal activity of composition 1.004 of Table 1 | | | | |
| B2.2.1 - SETFA | | | | |
| A-I | 1.25 | 8 | — | — |
| A-I | 2.5 | 14 | — | — |
| A-I | 5 | 51 | — | — |
| B-IV | 125 | 10 | — | — |
| B-IV | 250 | 8 | — | — |
| B-IV | 500 | 33 | — | — |
| B-IV | 1000 | 63 | — | — |
| A-I + B-IV | 2.5 + 125 | 43 | 22 | 20 |
| A-I + B-IV | 5 + 250 | 83 | 55 | 28 |
| A-I + B-IV | 2.5 + 250 | 35 | 20 | 15 |
| A-I + B-IV | 5 + 500 | 95 | 67 | 28 |
| A-I + B-IV | 1.25 + 250 | 30 | 14 | 16 |
| A-I + B-IV | 2.5 + 500 | 53 | 42 | 11 |
| A-I + B-IV | 5 + 1000 | 94 | 82 | 12 |
| B2.2.2 - ECHCG | | | | |
| A-I | 5 | 10 | — | — |
| A-I | 0.625 | 0 | — | — |
| A-I | 1.25 | 34 | — | — |
| B-IV | 500 | 78 | — | — |
| B-IV | 125 | 38 | — | — |

TABLE B2-continued

Post-emergence herbicidal activity of compounds of the present invention comprising mixtures of components (A) and (B) compared with activity of the individual components.

| | | | | |
|---|---|---|---|---|
| B-IV | 250 | 60 | — | — |
| A-I + B-IV | 5 + 500 | 93 | 80 | 13 |
| A-I + B-IV | 0.625 + 125 | 58 | 38 | 20 |
| A-I + B-IV | 1.25 + 250 | 75 | 62 | 13 |
| B2.2.3 - DIGSA | | | | |
| A-I | 5 | 48 | — | — |
| B-IV | 250 | 10 | — | — |
| B-IV | 500 | 15 | — | — |
| B-IV | 1000 | 55 | — | — |
| A-I + B-IV | 5 + 250 | 83 | 53 | 30 |
| A-I + B-IV | 5 + 500 | 95 | 55 | 40 |
| A-I + B-IV | 5 + 1000 | 99 | 76 | 23 |
| B2.2.4 - LOLPE | | | | |
| A-I | 1.25 | 0 | — | — |
| A-I | 2.5 | 0 | — | — |
| A-I | 5 | 14 | — | — |
| B-IV | 62.5 | 0 | — | — |
| B-IV | 125 | 0 | — | — |
| B-IV | 250 | 8 | — | — |
| B-IV | 500 | 38 | — | — |
| B-IV | 1000 | 65 | — | — |
| A-I + B-IV | 1.25 + 62.5 | 10 | 0 | 10 |
| A-I + B-IV | 2.5 + 125 | 23 | 0 | 23 |
| A-I + B-IV | 5 + 250 | 40 | 20 | 20 |
| A-I + B-IV | 2.5 + 250 | 30 | 8 | 22 |
| A-I + B-IV | 5 + 500 | 70 | 46 | 24 |
| A-I + B-IV | 5 + 1000 | 80 | 70 | 10 |
| B2.2.5 - ALOMY | | | | |
| A-I | 5 | 14 | — | — |
| B-IV | 500 | 8 | — | — |
| B-IV | 1000 | 8 | — | — |
| A-I + B-IV | 5 + 500 | 38 | 21 | 17 |
| A-I + B-IV | 5 + 1000 | 38 | 21 | 17 |
| B2.2.6 - AMARE | | | | |
| A-I | 0.625 | 51 | — | — |
| A-I | 1.25 | 76 | — | — |
| B-IV | 31.25 | 0 | — | — |
| B-IV | 62.5 | 15 | — | — |
| A-I + B-IV | 0.625 + 31.25 | 78 | 51 | 27 |
| A-I + B-IV | 1.25 + 62.5 | 90 | 80 | 10 |
| A-I + B-IV | 0.625 + 62.5 | 73 | 59 | 14 |
| Table B2.3 - Herbicidal activity of composition 1.005 of Table 1 | | | | |
| B2.3.1 - SETFA | | | | |
| A-I | 1.25 | 8 | — | — |
| A-I | 2.5 | 14 | — | — |
| A-I | 0.625 | 3 | — | — |
| B-V | 0.625 | 38 | — | — |
| B-V | 1.25 | 85 | — | — |
| A-I + B-V | 1.25 + 0.625 | 93 | 42 | 51 |
| A-I + B-V | 2.5 + 1.25 | 100 | 87 | 13 |
| A-I + B-V | 0.625 + 0.625 | 60 | 40 | 20 |
| A-I + B-V | 1.25 + 1.25 | 100 | 86 | 14 |
| A-I + B-V | 0.625 + 1.25 | 100 | 86 | 14 |
| B2.3.2 - ECHCG | | | | |
| A-I | 5 | 10 | — | — |
| A-I | 0.625 | 0 | — | — |
| A-I | 1.25 | 4 | — | — |
| B-V | 2.5 | 23 | — | — |
| B-V | 0.625 | 3 | — | — |
| B-V | 1.25 | 9 | — | — |
| A-I + B-V | 5 + 2.5 | 45 | 30 | 15 |
| A-I + B-V | 0.625 + 0.625 | 15 | 3 | 12 |
| A-I + B-V | 1.25 + 1.25 | 83 | 12 | 71 |
| B2.3.3 - DIGSA | | | | |
| A-I | 1.25 | 9 | — | — |
| A-I | 0.625 | 3 | — | — |
| B-V | 0.625 | 43 | — | — |
| A-I + B-V | 1.25 + 0.625 | 65 | 48 | 18 |
| A-I + B-V | 0.625 + 0.625 | 65 | 44 | 21 |

TABLE B2-continued

Post-emergence herbicidal activity of compounds of the present invention comprising mixtures of components (A) and (B) compared with activity of the individual components.

| | | | | |
|---|---|---|---|---|
| B2.3.4 - LOLPE | | | | |
| A-I | 1.25 | 0 | — | — |
| A-I | 2.5 | 0 | — | — |
| B-V | 1.25 | 8 | — | — |
| B-V | 2.5 | 15 | — | — |
| A-I + B-V | 1.25 + 1.25 | 68 | 8 | 60 |
| A-I + B-V | 2.5 + 2.5 | 28 | 15 | 12 |
| B2.3.5 - ALOMY | | | | |
| A-I | 1.25 | 1 | — | — |
| B-V | 1.25 | 10 | — | — |
| A-I + B-V | 1.25 + 1.25 | 63 | 11 | 52 |
| B2.3.6 - IPOHE | | | | |
| A-I | 0.625 | 24 | — | — |
| B-V | 0.3125 | 58 | — | — |
| A-I + B-V | 0.625 + 0.3125 | 85 | 68 | 17 |
| B2.3.7 - STEME | | | | |
| A-I | 0.625 | 29 | — | — |
| B-V | 0.3125 | 25 | — | — |
| A-I + B-V | 0.625 + 0.3125 | 75 | 47 | 28 |
| Table B2.4 - Herbicidal activity of composition 1.002 of Table 1 | | | | |
| B2.4.1 - SETFA | | | | |
| A-I | 2.5 | 29 | — | — |
| B-II | 5 | 0 | — | — |
| A-I + B-II | 2.5 + 5 | 45 | 29 | 16 |
| B2.4.2 - DIGSA | | | | |
| A-I | 2.5 | 34 | — | — |
| A-I | 5 | 63 | — | — |
| A-I | 10 | 78 | — | — |
| B-II | 5 | 0 | — | — |
| B-II | 10 | 0 | — | — |
| B-II | 2.5 | 0 | — | — |
| A-I + B-II | 2.5 + 5 | 60 | 34 | 26 |
| A-I + B-II | 5 + 10 | 80 | 63 | 17 |
| A-I + B-II | 2.5 + 2.5 | 48 | 34 | 14 |
| A-I + B-II | 5 + 5 | 75 | 63 | 12 |
| A-I + B-II | 5 + 2.5 | 75 | 63 | 12 |
| A-I + B-II | 10 + 5 | 90 | 78 | 12 |
| B2.4.3 - LOLPE | | | | |
| A-I | 10 | 30 | — | — |
| B-II | 10 | 0 | — | — |
| B-II | 5 | 0 | | |
| A-I + B-II | 10 + 10 | 48 | 30 | 18 |
| A-I + B-II | 10 + 5 | 45 | 30 | 15 |
| B2.4.4 - ALOMY | | | | |
| A-I | 10 | 41 | — | — |
| B-II | 10 | 0 | — | — |
| A-I + B-II | 10 + 10 | 53 | 41 | 12 |
| B2.4.5 - IPOHE | | | | |
| A-I | 10 | 60 | — | — |
| B-II | 10 | 48 | — | — |
| B-II | 2.5 | 23 | | |
| A-I + B-II | 10 + 5 | 93 | 75 | 18 |
| A-I + B-II | 10 + 2.5 | 91 | 69 | 22 |
| B2.4.6 - ABUTH | | | | |
| A-I | 0.625 | 15 | — | — |
| B-II | 0.625 | 3 | — | — |
| A-I + B-II | 0.625 + 0.625 | 28 | 17 | 11 |
| B2.4.7 - CHEAL | | | | |
| A-I | 1.25 | 53 | — | — |
| B-II | 1.25 | 0 | — | — |
| A-I + B-II | 1.25 + 1.25 | 68 | 53 | 15 |

TABLE B2-continued

Post-emergence herbicidal activity of compounds of the present invention comprising mixtures of components (A) and (B) compared with activity of the individual components.

| | | | | |
|---|---|---|---|---|
| B2.4.8 - AMARE | | | | |
| A-I | 1.25 | 70 | — | — |
| B-II | 2.5 | 10 | — | — |
| A-I + B-II | 1.25 + 2.5 | 85 | 73 | 12 |
| Table B2.5 - Herbicidal activity of composition 1.001 of Table 1 | | | | |
| B2.5.1 - DIGSA | | | | |
| A-I | 2.5 | 34 | — | — |
| B-I | 5 | 0 | — | — |
| A-I + B-I | 2.5 + 5 | 48 | 34 | 14 |
| B2.5.2 - LOLPE | | | | |
| A-I | 5 | 21 | — | — |
| A-I | 10 | 30 | — | — |
| B-I | 5 | 0 | — | — |
| A-I + B-I | 5 + 5 | 35 | 21 | 14 |
| A-I + B-I | 10 + 5 | 43 | 30 | 13 |
| Table B2.6 - Herbicidal activity of composition 1.006 of Table 1 | | | | |
| B2.6.1 - SETFA | | | | |
| A-I | 0.625 | 7 | — | — |
| A-I | 2.5 | 29 | — | — |
| B-VI | 0.625 | 0 | — | — |
| B-VI | 1.25 | 0 | — | — |
| A-I + B-VI | 0.625 + 0.625 | 25 | 7 | 18 |
| A-I + B-VI | 2.5 + 1.25 | 43 | 29 | 14 |
| B2.6.2 - DIGSA | | | | |
| A-I | 0.625 | 6 | — | — |
| A-I | 2.5 | 34 | — | — |
| A-I | 10 | 78 | — | — |
| B-VI | 0.625 | 0 | — | — |
| B-VI | 1.25 | 0 | — | — |
| B-VI | 5 | 8 | — | — |
| A-I + B-VI | 0.625 + 0.625 | 30 | 6 | 24 |
| A-I + B-VI | 2.5 + 1.25 | 45 | 34 | 11 |
| A-I + B-VI | 10 + 5 | 90 | 79 | 11 |
| B2.6.3 - LOLPE | | | | |
| A-I | 10 | 30 | — | — |
| B-VI | 5 | 8 | — | — |
| A-I + B-VI | 10 + 5 | 50 | 35 | 15 |
| B2.6.4 - IPOHE | | | | |
| A-I | 10 | 60 | — | — |
| B-VI | 2.5 | 38 | — | — |
| A-I + B-VI | 10 + 2.5 | 87 | 75 | 12 |
| B2.6.5 - STEME | | | | |
| A-I | 0.625 | 44 | — | — |
| B-VI | 1.25 | 50 | — | — |
| A-I + B-VI | 0.625 + 1.25 | 83 | 72 | 11 |

The invention claimed is:

1. A composition comprising as component (A), a compound of formula (A-I) or an agrochemically acceptable salt thereof:

(A-I)

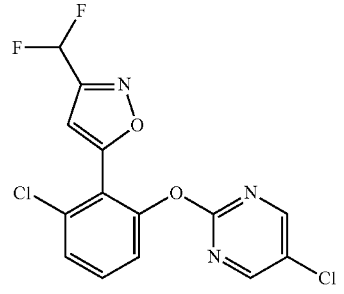

and as component (B) at least one compound, or agrochemically acceptable salt thereof, selected from the group consisting of:

B-II

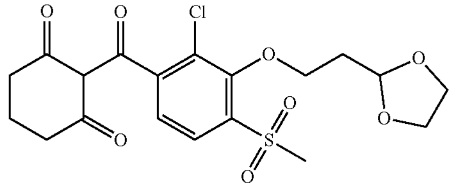

B-III

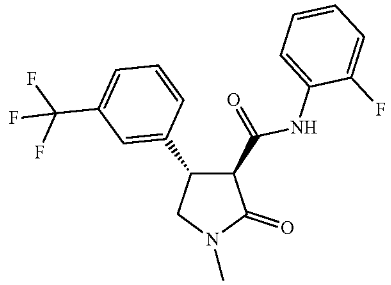

B-IV

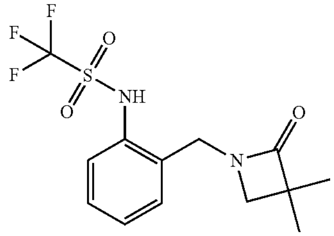

B-V

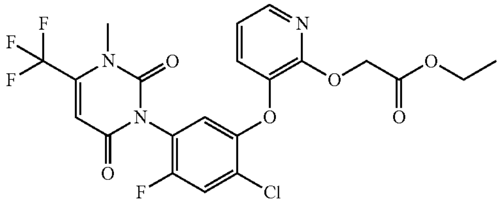

, and

-continued

B-VI

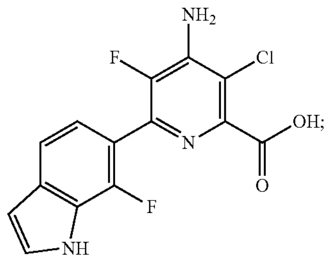

wherein the weight ratio of component (A) to component (B) is from 0.01:1 to 100:1; and wherein in use the weight ratio of component (A) to component (B) gives rise to a synergistic herbicidal effect as determined by the Colby formula.

2. The composition according to claim 1 wherein the weight ratio of component (A) to component (B) is from 0.025:1 to 20:1.

3. The composition according to claim 1, wherein the weight ratio of component (A) to component (B) is from 1:30 to 16:1.

4. The composition according to claim 1, wherein the component (B) is B-II.

5. The composition according to claim 1, wherein the component (B) is B-III.

6. The composition according to claim 1, wherein the component (B) is B-IV.

7. The composition according to claim 1, wherein the component (B) is B-V.

8. The composition according to claim 1, wherein the component (B) is B-VI.

9. The composition according to claim 1, wherein the synergistic herbicidal effect is phytotoxicity to at least one of *Setaria faberi* (SETFA), *Echinochloa crus-galli* (ECHCG), *Digitaria sanguinalis* (DIGSA), *Lolium perenne* (LOLPE), *Alopecurus myosuroides* (ALOMY), *Chenopodium album* (CHEAL), *Ipomoea hederacea* (IPOHE), *Stellaria media* (STEME), *Abutilon threophrasti* (ABUTH), or *Amaranthus retroflexus* (AMARE).

10. An agrochemical composition comprising a herbicidally effective amount of a composition as defined in claim 1; wherein in use the weight ratio of component (A) to component (B) gives rise to a synergistic herbicidal effect as determined by the Colby formula.

11. The composition according to claim 10, further comprising at least one additional active ingredient.

12. The composition according to claim 11, wherein the at least one additional active ingredient comprises at least one additional pesticide.

13. The composition according to claim 12, wherein the additional pesticide is a herbicide or herbicide safener.

14. The composition according to claim 10, additionally comprising an agriculturally-acceptable formulation adjuvant and/or an agrochemically-acceptable diluent or carrier.

15. A method of controlling unwanted plant growth, comprising applying a synergistically herbicidally effective amount of a composition as claimed in claim 1 to the unwanted plants, to plant parts thereof or to the locus thereof; wherein in use the weight ratio of component (A) to component (B) gives rise to a synergistic herbicidal effect as determined by the Colby formula.

16. The method according to claim 15, wherein the synergistic herbicidal effect is phytotoxicity to at least one of *Setaria faberi* (SETFA), *Echinochloa crus-galli* (ECHCG), *Digitaria sanguinalis* (DIGSA), *Lolium perenne* (LOLPE), *Alopecurus myosuroides* (ALOMY), *Chenopodium album* (CHEAL), *Ipomoea hederacea* (IPOHE), *Stellaria media* (STEME), *Abutilon threophrasti* (ABUTH), or *Amaranthus retroflexus* (AMARE).

17. A formulation comprising a composition according to claim 1, said formulation comprising from 0.1 to 99% by weight of components (A) and (B) and from 1 to 99.9% by weight of a formulation adjuvant, wherein the formulation adjuvant comprises from 0 to 25% by weight of a surface-active substance; wherein in use the weight ratio of component (A) to component (B) gives rise to a synergistic herbicidal effect as determined by the Colby formula.

18. A concentrated composition for dilution by a user, comprising a composition according to claim 1, wherein the concentrated composition comprises from 2 to 80% by weight components A and B; wherein in use the weight ratio of component (A) to component (B) gives rise to a synergistic herbicidal effect as determined by the Colby formula.

19. A method of controlling unwanted plant growth, comprising applying a synergistically herbicidally effective amount of an agrochemical composition of claim 10 to the unwanted plants, to plant parts thereof or to the locus thereof; wherein in use the weight ratio of component (A) to component (B) gives rise to a synergistic herbicidal effect as determined by the Colby formula.

* * * * *